US012700959B1

(12) United States Patent
Chen

(10) Patent No.: US 12,700,959 B1
(45) Date of Patent: *Aug. 4, 2026

(54) CHANNEL ASSIGNMENT METHOD, COMMUNICATION METHOD, AND COMMUNICATION NETWORK

(71) Applicant: Hongming Chen, Hong Kong (HK)

(72) Inventor: Hongming Chen, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 18/925,188

(22) Filed: Oct. 24, 2024

(51) Int. Cl.
H04L 5/00 (2006.01)
H04W 28/20 (2009.01)
H04W 72/0453 (2023.01)

(52) U.S. Cl.
CPC ........... *H04L 5/0037* (2013.01); *H04W 28/20* (2013.01); *H04W 72/0453* (2013.01)

(58) Field of Classification Search
None
See application file for complete search history.

(56) References Cited

U.S. PATENT DOCUMENTS

| | | | | |
|---|---|---|---|---|
| 10,932,264 | B2 * | 2/2021 | Liu | H04W 4/70 |
| 10,959,067 | B1 * | 3/2021 | Fang | H04W 4/38 |
| 11,606,777 | B2 * | 3/2023 | Sun | H04L 5/0053 |
| 12,143,974 | B2 * | 11/2024 | Kuang | H04L 5/0094 |
| 2009/0232087 | A1 * | 9/2009 | Chen | H04L 5/0037 |
| | | | | 370/330 |
| 2014/0098663 | A1 * | 4/2014 | Vos | H04W 28/06 |
| | | | | 370/329 |

| | | | | |
|---|---|---|---|---|
| 2018/0367193 | A1 * | 12/2018 | Tan | H04B 7/0639 |
| 2019/0335460 | A1 * | 10/2019 | Liu | H04W 4/70 |
| 2019/0349737 | A1 * | 11/2019 | Lee | H04W 40/24 |
| 2020/0052734 | A1 * | 2/2020 | Talla | H04B 1/1081 |
| 2020/0196313 | A1 * | 6/2020 | Tao | H04W 72/51 |
| 2022/0161898 | A1 * | 5/2022 | Kim | H04B 17/336 |
| 2022/0174530 | A1 * | 6/2022 | Sudo | H04W 16/14 |
| 2022/0374026 | A1 * | 11/2022 | Vougioukas | G05D 1/223 |
| 2023/0308129 | A1 * | 9/2023 | Poojary | H04B 1/7075 |
| 2024/0053732 | A1 * | 2/2024 | Wen | G05B 19/4183 |
| 2024/0053733 | A1 * | 2/2024 | Wen | G05B 19/4183 |
| 2024/0284212 | A1 * | 8/2024 | Mclean | H04B 1/0003 |

FOREIGN PATENT DOCUMENTS

| | | | | | |
|---|---|---|---|---|---|
| CN | 111182508 | A | * | 5/2020 | H04L 5/0001 |
| CN | 114916067 | A | * | 8/2022 | H04W 72/0453 |

* cited by examiner

*Primary Examiner* — Hassan A Phillips
*Assistant Examiner* — Gautam Sharma
(74) *Attorney, Agent, or Firm* — Sam Pierce

(57) ABSTRACT

A channel assignment method is applied to a target communication network including a server, at least one LoRa gateway, and a plurality of LoRa terminal device groups, and each of the plurality of LoRa terminal device groups includes at least one LoRa terminal device. The channel assignment method includes: dividing each of at least one frequency sub-band in a target LoRa communication frequency band into a plurality of channels; wherein each of the plurality of channels corresponding to each of the at least one frequency sub-band occupies an independent frequency range; and assigning a target channel from the plurality of channels corresponding to each of the at least one frequency sub-band to each of the plurality of LoRa terminal device groups to enable each of the at least one LoRa terminal device in each of the plurality of LoRa terminal device groups to communicate with a corresponding LoRa gateway.

9 Claims, 2 Drawing Sheets dividing each of at least one frequency sub-band in a target LoRa communication frequency band into a plurality of channels; wherein each of the plurality of channels corresponding to each of the at least one frequency sub-band occupies an independent frequency range ⟋S101 assigning a target channel from the plurality of channels corresponding to each of the at least one frequency sub-band to each of the plurality of LoRa terminal device groups to enable each of the at least one LoRa terminal device in each of the plurality of LoRa terminal device groups to communicate with a corresponding LoRa gateway ⟋S102

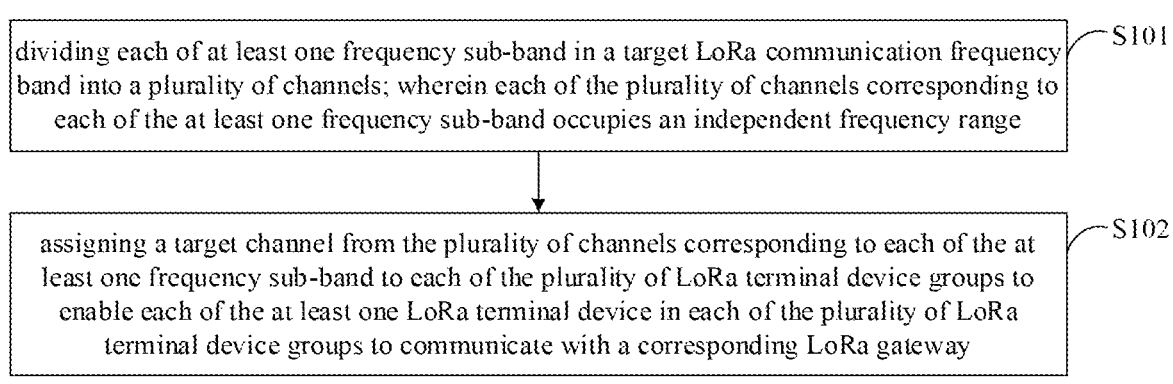

S101 dividing each of at least one frequency sub-band in a target LoRa communication frequency band into a plurality of channels; wherein each of the plurality of channels corresponding to each of the at least one frequency sub-band occupies an independent frequency range

S102 assigning a target channel from the plurality of channels corresponding to each of the at least one frequency sub-band to each of the plurality of LoRa terminal device groups to enable each of the at least one LoRa terminal device in each of the plurality of LoRa terminal device groups to communicate with a corresponding LoRa gateway

FIG. 1

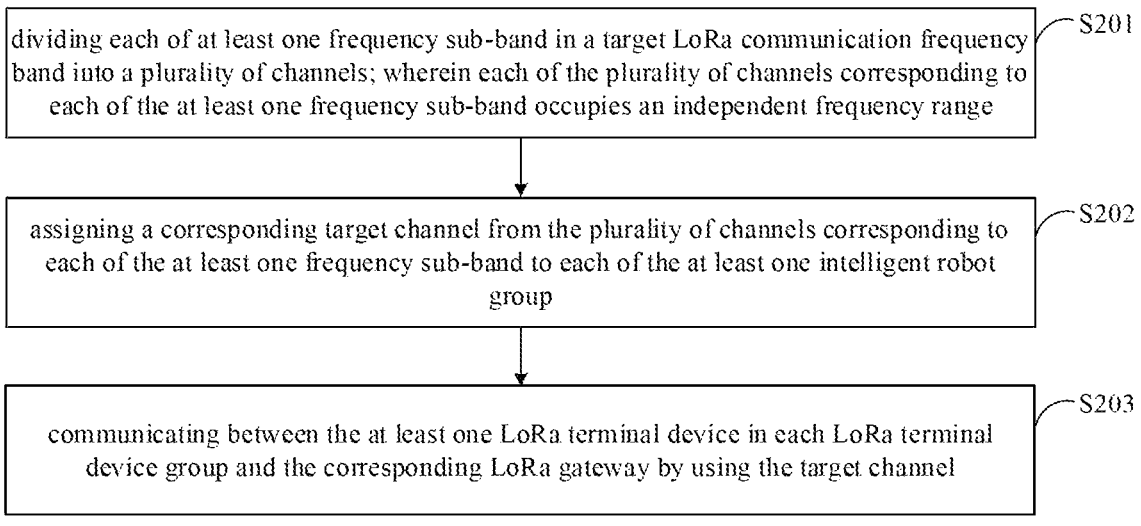

S201 dividing each of at least one frequency sub-band in a target LoRa communication frequency band into a plurality of channels; wherein each of the plurality of channels corresponding to each of the at least one frequency sub-band occupies an independent frequency range

S202 assigning a corresponding target channel from the plurality of channels corresponding to each of the at least one frequency sub-band to each of the at least one intelligent robot group

S203 communicating between the at least one LoRa terminal device in each LoRa terminal device group and the corresponding LoRa gateway by using the target channel

FIG. 2

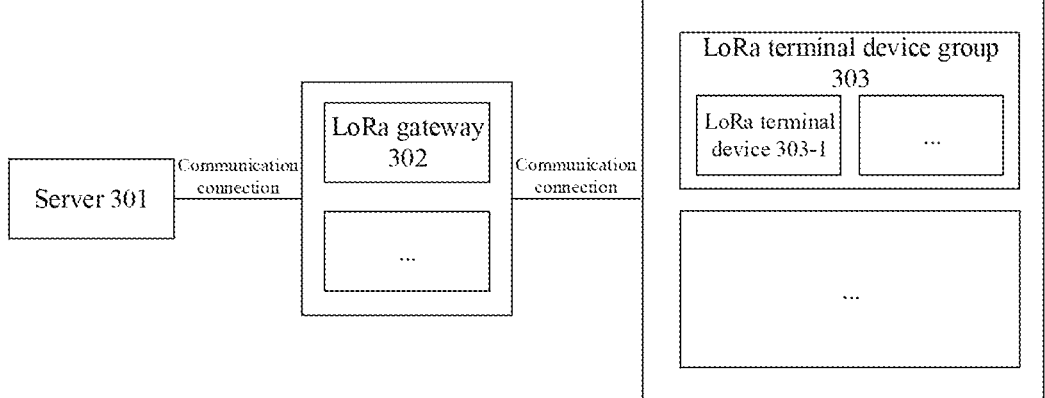

Server 301

Communication connection

LoRa gateway 302

...

Communication connection

LoRa terminal device group 303

LoRa terminal device 303-1

CHANNEL ASSIGNMENT METHOD, COMMUNICATION METHOD, AND COMMUNICATION NETWORK

TECHNICAL FIELD

The present disclosure relates to the field of communications and, in particular, to a channel assignment method, a communication method, a communication network, an electronic device, and a storage medium.

BACKGROUND

As an emerging information technology, the Internet of Things (IoT) technology has been widely used in various fields such as smart cities, agricultural monitoring, and industrial production. A communication network of the IoT system generally includes a server, a gateway, and a terminal device. The gateway, as a relay device, is responsible for uploading the data collected by the terminal device to the server and, at the same time, sending instructions from the server to the terminal device. The terminal device, as a sensing layer in the IoT system, is mainly used for collecting environmental parameters or executing specific control commands.

In many application scenarios of the IoT, a large number of terminal devices are often configured in the communication network, and these terminal devices are distributed in a relatively large working region. In this case, the communication quality between the gateway and the terminal devices may be degraded due to a variety of factors. For example, the communication quality may be degraded due to channel congestion caused by an excessive number of terminal devices. For example, the communication quality may become unstable due to serious signal attenuation when the communication distance between the gateway and the terminal devices is too long. In addition, mutual interference between different channels in the same frequency band may also degrade the communication quality. The degradation of the communication quality between the gateway and the terminal devices often affects the real-time performance, reliability, and stability of the data exchange between the server and the terminal devices, thus affecting the performance and efficiency of the entire IoT system and even making the system unable to operate normally or fail to satisfy the requirements of the actual application.

Therefore, how to guarantee the communication quality between the gateway and the terminal devices has always been a technical problem that has to be faced during the application of the IoT technology.

SUMMARY

Embodiments of the present disclosure provide a channel assignment method, a communication method, a communication network, an electronic device, and a storage medium to solve one or more of the above technical problems.

In a first aspect, the embodiments of the present disclosure provide a channel assignment method, applied to a target communication network, the target communication network comprising a server, at least one LoRa gateway, and a plurality of LoRa terminal device groups, each of the plurality of LoRa terminal device groups comprising at least one LoRa terminal device, and the method comprising:

dividing each of at least one frequency sub-band in a target LoRa communication frequency band into a plurality of channels; wherein each of the plurality of channels corresponding to each of the at least one frequency sub-band occupies an independent frequency range; and assigning a target channel from the plurality of channels corresponding to each of the at least one frequency sub-band to each of the plurality of LoRa terminal device groups to enable each of the at least one LoRa terminal device in each of the plurality of LoRa terminal device groups to communicate with a corresponding LoRa gateway.

In an optional implementation, the method further comprises:

selecting the target LoRa communication frequency band from an available LoRa communication frequency band according to a preset communication requirement; and dividing the target LoRa communication frequency band into the at least one frequency sub-band.

In an optional implementation, the dividing each of at least one frequency sub-band in a target LoRa communication frequency band into a plurality of channels comprises:

acquiring a preset channel width; and successively dividing each of at least one frequency sub-band into a plurality of independent frequency ranges according to the channel width, and defining the plurality of channels corresponding to each of the at least one frequency sub-band by using the plurality of frequency ranges.

In an optional implementation, the at least one frequency sub-band comprises a plurality of frequency sub-bands; the assigning a target channel from the plurality of channels corresponding to each of the at least one frequency sub-band to each of the plurality of LoRa terminal device groups comprises:

executing at least one channel assignment iteration until each of the plurality of LoRa terminal device groups is assigned with a corresponding candidate channel; wherein each of the at least one channel assignment iteration is executed as follows: selecting a target frequency sub-band that is not subjected to a channel quality assessment from the plurality of frequency sub-bands, performing the channel quality assessment on the target frequency sub-band to obtain a channel quality of each of a plurality of channels corresponding to the target frequency sub-band, and selecting, from the plurality of channels corresponding to the target frequency sub-band according to the channel quality, a part of the plurality of channels to be assigned to at least part of the plurality of LoRa terminal device groups as corresponding candidate channels;

when the at least one channel assignment iteration ends, determining whether remaining frequency sub-bands that are not subjected to the channel quality assessment exist in the plurality of frequency sub-bands; and when the remaining frequency sub-bands do not exist, taking the candidate channel corresponding to each of the plurality of LoRa terminal device groups as the target channel.

In an optional implementation, when the remaining frequency sub-bands exist, the method further comprises:

executing at least one channel optimization iteration until each of the plurality of frequency sub-bands is subjected to the channel quality assessment; wherein each of the at least one channel optimization iteration is executed as follows: selecting a target frequency sub-band from the remaining frequency sub-bands, performing the channel quality assessment on the target frequency sub-band to obtain a channel quality of each of a plurality of channels corresponding to the target frequency sub-band, and when an available channel whose channel quality is superior to the channel quality of the candidate channel exists in the plurality of channels corresponding to the target frequency sub-band, updating the candidate channel corresponding to each of the plurality of LoRa terminal device groups by using the available channel; and when the at least one channel optimization iteration ends, taking the candidate channel corresponding to each of the plurality of LoRa terminal device groups as the target channel.

In an optional implementation, the selecting, from the plurality of channels corresponding to the target frequency sub-band according to the channel quality, a part of the plurality of channels to be assigned to at least part of the plurality of LoRa terminal device groups as corresponding candidate channels comprises:

acquiring a preset channel quality standard;

selecting, from the plurality of channels corresponding to the target frequency sub-band, a plurality of usable channels whose channel quality is superior to the channel quality standard; and when a first number does not exceed a second number, assigning the plurality of usable channels to at least part of LoRa terminal device groups in the plurality of LoRa terminal device groups which have not been assigned with candidate channels as corresponding candidate channels, wherein the first number is a number of the plurality of usable channels, and the second number is a number of the LoRa terminal device groups which have not been assigned with candidate channels.

In an optional implementation, in a second channel assignment iteration and subsequent channel assignment iterations, when the first number exceeds the second number, the method further comprises:

sorting the plurality of usable channels according to the channel quality to obtain a corresponding first sorting result;

selecting, from the plurality of usable channels according to the first sorting result, a part of the plurality of usable channels to be assigned to the LoRa terminal device groups which have not been assigned with candidate channels as the corresponding candidate channels; and determining remaining usable channels in the plurality of usable channels, and when the available channel whose channel quality is superior to the channel quality of the candidate channel exists in the remaining usable channels, updating the candidate channel corresponding to each of the plurality of LoRa terminal device groups by using the available channel.

In an optional implementation, the performing the channel quality assessment on the target frequency sub-band to obtain a channel quality of each of a plurality of channels corresponding to the target frequency sub-band comprises:

controlling, through the server, the at least one LoRa gateway to send a test signal to each of the at least one LoRa terminal device by using a respective one of the plurality of channels corresponding to the target frequency sub-band;

performing a signal measurement on a received signal received by each of the at least one LoRa terminal device to obtain a corresponding signal measurement result; and identifying the channel quality by using the signal measurement result.

In an optional implementation, the signal measurement result comprises at least one of a signal strength of the received signal and a signal-to-noise ratio of the received signal.

In an optional implementation, the assigning a target channel from the plurality of channels corresponding to each of the at least one frequency sub-band to each of the plurality of LoRa terminal device groups comprises:

performing a channel quality assessment on each of the at least one frequency sub-band to obtain a channel quality of each of the plurality of channels corresponding to each of the at least one frequency sub-band;

sorting the plurality of channels corresponding to each of the at least one frequency sub-band according to the channel quality to obtain a corresponding second sorting result; and selecting the target channel from the plurality of channels corresponding to each of the at least one frequency sub-band according to the second sorting result.

In a second aspect, the embodiments of the present disclosure provide a communication method, applied to a target communication network, the target communication network comprising a server, at least one LoRa gateway, and a plurality of intelligent robot groups, each of the plurality of intelligent robot groups comprising at least one intelligent robot, each of the at least one intelligent robot being provided with a LoRa communication module, and the method comprising:

dividing each of at least one frequency sub-band in a target LoRa communication frequency band into a plurality of channels; wherein each of the plurality of channels corresponding to each of the at least one frequency sub-band occupies an independent frequency range;

assigning a corresponding target channel from the plurality of channels corresponding to each of the at least one frequency sub-band to each of the at least one intelligent robot group; and communicating between the at least one LoRa terminal device in each LoRa terminal device group and the corresponding LoRa gateway by using the target channel.

In a third aspect, the embodiments of the present disclosure provide a communication network, comprising a server, at least one LoRa gateway, and a plurality of LoRa terminal device groups, each of the plurality of LoRa terminal device groups comprising at least one LoRa terminal device;

wherein the at least one LoRa terminal device in each of the plurality of LoRa terminal device groups communicates with a correspondingly configured LoRa gateway through a target channel; the target channel is assigned according to the method according to any embodiment of the present disclosure.

In an optional implementation, a network topology of a communication sub-network between a LoRa terminal device and a LoRa gateway comprises a star topology, a mesh topology or a hybrid topology.

In a fourth aspect, the embodiments of the present disclosure provide an electronic device, comprising a memory, a processor, and a computer program stored in the memory, wherein the processor, when executing the computer program, implements the method according to embodiment of the present disclosure.

In a fifth aspect, the embodiments of the present disclosure provide a computer-readable storage medium, wherein the computer-readable storage medium has a computer program stored therein, and the computer program, when executed by a processor, implements the method according to any embodiment of the present disclosure.

Compared with the existing art, the present disclosure has the following advantages.

In the technical solutions of the present disclosure, a target channel in multiple channels corresponding to at least one frequency sub-band is assigned to each of multiple LoRa terminal device groups to enable each LoRa terminal device in each LoRa terminal device group to communicate with a correspondingly configured LoRa gateway. In this manner, when the communication network is configured with multiple LoRa terminal devices, the multiple LoRa terminal devices may reasonably be divided into multiple LoRa terminal device groups, and then an exclusive target channel is assigned to each LoRa terminal device group to enable one or more LoRa terminal devices in each LoRa terminal device group to communicate with a corresponding LoRa gateway through the exclusive target channel of the device group. In this case, different LoRa terminal device groups do not share channels, and the exclusive target channel assigned to each LoRa terminal device group does not need to carry the communication requirements of other LoRa terminal devices that are not affiliated with the LoRa terminal device group. In this way, each target channel can effectively avoid facing the channel congestion caused by an excessive number of terminal devices.

Therefore, in the technical solutions of the present disclosure, the channel congestion caused by the insufficiency of channel resources in the presence of the excessive number of LoRa terminal devices can be effectively avoided, thereby effectively guaranteeing the communication quality between the gateway and the terminal devices. Even when a large number of LoRa terminal devices are configured in the communication network, by adopting the technical solutions of the present disclosure for channel assignment, the channel congestion caused by the insufficiency of channel resources in the presence of the excessive number of LoRa terminal devices can be effectively avoided, thereby effectively guaranteeing the communication quality between the gateway and the terminal devices.

Further, in the case where an exclusive target channel is assigned to each of multiple LoRa terminal device groups and each target channel can support communication between multiple LoRa terminal devices and the LoRa gateway, communication between multiple LoRa terminal devices and the correspondingly configured LoRa gateways can be carried out concurrently. The concurrent communication enables the communication network to simultaneously satisfy more communication requirements, thereby significantly improving the overall communication efficiency of the communication network.

In addition, since each of the multiple channels corresponding to each of the at least one frequency sub-band occupies an independent frequency range, the communication signals between different channels are isolated from each other. In this manner, the mutual interference between different channels can be effectively avoided, thereby further guaranteeing the communication quality between the gateway and the terminal devices.

In addition, the LoRa communication technology has the advantages of low power consumption and long distance transmission. The use of the LoRa communication technology not only reduces the power consumption of the LoRa terminal devices, but also guarantees the remote communication between the LoRa terminal devices and the LoRa gateway, thereby effectively avoiding serious signal attenuation between the LoRa terminal devices and the LoRa gateway due to long communication distance and guaranteeing the stability of the communication quality.

BRIEF DESCRIPTION OF THE DRAWINGS

In the drawings, unless otherwise specified, like reference numerals refer to like or similar parts or elements throughout the multiple drawings. These drawings are not necessarily to be drawn to scale. It should be understood that these drawings only illustrate some of the embodiments disclosed by the present disclosure and are not construed as limiting the scope of the present disclosure.

FIG. 1 shows a flowchart of a channel assignment method provided in an embodiment of the present disclosure;

FIG. 2 shows a flowchart of a communication method provided in an embodiment of the present disclosure;

FIG. 3 shows a schematic diagram of a communication network provided in an embodiment of the present disclosure;

DETAILED DESCRIPTION

Figure 4:
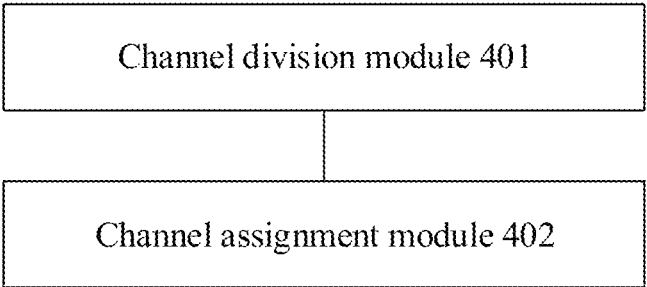
FIG. 4 shows a schematic diagram of a channel assignment apparatus provided in an embodiment of the present disclosure.

Details are set forth below to facilitate a thorough understanding of the present disclosure. However, the present disclosure is capable of being implemented in many other forms different from those described herein, and those skilled in the art may make similar extensions without violating the connotations of the present disclosure, and thus the present disclosure is not limited by the specific implementations disclosed below.

To facilitate the understanding of the technical solutions of the embodiments of the present disclosure, the following describes the relevant technologies of the embodiments of the present disclosure. The following related technologies, as optional solutions, may be arbitrarily combined with the technical solutions of the embodiments of the present disclosure, all of which fall within the scope of protection of the embodiments of the present disclosure.

In a communication network of a common IoT system, the wireless fidelity (Wi-Fi) communication technology is generally adopted to support the communication between a gateway and a terminal device. However, the Wi-Fi communication technology often encounters the following problems in its application:

1. High power consumption of communication devices. Specifically, the Wi-Fi communication technology continuously maintains a strong signal strength to maintain a high quality of data transmission. Such a continuous high-strength signal transmission leads to an increase in the power consumption of the communication device.

2. Limited coverage of the Wi-Fi signal. Specifically, the Wi-Fi signal is easily blocked by physical obstacles during propagation, resulting in signal attenuation. Further, as the communication distance increases, the signal strength will be gradually weakened. Therefore, the coverage of the Wi-Fi signal is limited.

3. Limited available channel resources. Specifically, the frequency bands available for the Wi-Fi communication technology are generally frequency bands of 2.4 gigahertz (GHz) and 5 GHz, and these two frequency bands have a limited and fixed number of available channels. Especially in the frequency band of 2.4 GHz, there are limited number of available channels, and the spacing between neighboring channels is narrower.

4. Overlapping of some of the channels. Specifically, some neighboring channels in the frequency bands of 2.4 GHz and 5 GHz overlap with each other.

5. Impact of the multipath effect. The Wi-Fi signal will be affected by the multipath effect during propagation.

Because of the above problems in the application of the Wi-Fi communication technology, in the case of the use of the Wi-Fi communication technology to support the communication between the gateway and the terminal device, when a large number of terminal devices need to be configured in the communication network and these terminal devices are distributed in a relatively large working region, there will often be a problem that the communication quality between the gateway and the terminal devices cannot be guaranteed.

Specifically, at least part of the channels may be congested due to an excessive number of terminal devices, thereby reducing the communication quality between gateway and some of the terminal devices. Further, when the communication distance between the gateway and the terminal devices is long, the signal attenuation will become serious, thereby resulting in an unstable communication quality between the gateway and some of the terminal devices. In addition, the channel overlapping and the multipath effect may lead to mutual interference between communication signals and also reduce the communication quality between the gateway and some of the terminal devices.

For example, a large number of intelligent robots are often deployed in a logistics IoT communication network (at this point, the intelligent robots are the terminal devices in the logistics IoT communication network), and these intelligent robots are often distributed in a large logistics park to perform their respective tasks. In this case, if the Wi-Fi communication technology is used to support the communication between the gateway and the intelligent robots, the logistics IoT communication network will face the problem of degradation of communication quality due to channel congestion caused by the excessive number of terminal devices, the problem of unstable communication quality due to serious signal attenuation caused by the long communication distance between the gateway and the terminal devices, and the problem of degradation of communication quality due to mutual interference between different channels in the same frequency band.

In addition to the problem that the communication quality between the gateway and the terminal devices cannot be guaranteed, if the Wi-Fi communication technology is used to support the communication between the gateway and the terminal devices, there is also a problem that the power consumption of the terminal devices is high.

It should be noted that even if the Wi-Fi communication technology is not used to support the communication between the gateway and the terminal devices, if there is still the problem of channel congestion caused by the excessive number of terminal devices, serious signal attenuation caused by the long communication distance between the gateway and the terminal devices, or mutual interference between different channels, the communication quality between the gateway and the terminal devices is also degraded. Therefore, how to guarantee the communication quality between the gateway and the terminal devices has always been a technical problem that has to be faced during the application of the IoT technology.

To solve one or more of the above technical problems, the embodiments of the present disclosure provide a channel assignment solution. The channel assignment solution can be applied to a target communication network. The target communication network includes a server, at least one long rang (LoRa) gateway, and multiple LoRa terminal device groups. Each LoRa terminal device group includes at least one LoRa terminal device. The channel assignment solution may specifically include the following steps. First, regarding at least one frequency sub-band in a target LoRa communication frequency band, each frequency sub-band is divided into multiple channels, and the multiple channels corresponding to each of the at least one frequency sub-band occupies an independent frequency range. Then, a target channel in the multiple channels corresponding to each of the at least one frequency sub-band is assigned to each LoRa terminal device group to enable each LoRa terminal device in each LoRa terminal device group to communicate with a correspondingly configured LoRa gateway.

In the embodiments of the present disclosure, the target communication network belongs to a communication network of an IoT system. Specifically, the target communication network may refer to a logistics IoT communication network, an industrial IoT communication network, a smart home IoT communication network, a smart city communication network, an agricultural IoT communication network, an intelligent transport IoT communication network, etc.

The target communication network at least includes a server, at least one LoRa gateway, and multiple LoRa terminal device groups. Each LoRa terminal device group includes at least one LoRa terminal device. Specifically, the LoRa gateway refers to a gateway that transmits data using the LoRa communication technology. The LoRa terminal device refers to a terminal device configured with a LoRa communication module. The LoRa communication module is a wireless communication hardware component that performs communication based on the LoRa communication technology. The communication (i.e., data transmission) between the LoRa terminal device and the LoRa gateway is implemented through the LoRa communication module.

Specifically, in the target communication network, the wireless communication connection between the LoRa terminal device and the LoRa gateway is established through the LoRa communication technology. The server and the LoRa gateway are generally connected through a wired communication connection such as an Ethernet connection to guarantee stable data transmission and low latency. However, depending on the actual requirements, the server and the LoRa gateway may also be connected through wireless communication such as Wi-Fi or cellular networks to achieve flexible deployment and greater communication coverage.

When the target communication network specifically refers to a logistics IoT communication network, the LoRa terminal device may refer to an intelligent robot configured with a LoRa communication module. The intelligent robot includes, but is not limited to, an automated guided vehicle (AGV), a stacking robot, and a sorting robot.

When the target communication network specifically refers to an industrial IoT communication network, the LoRa terminal device may refer to an industrial automation device and a sensor each configured with a LoRa communication module. The industrial automation device and the sensor include, but are not limited to, an intelligent manufacturing device, a production line monitoring device, an industrial robot, and an environmental monitoring sensor.

When the target communication network specifically refers to an agricultural IoT communication network, the LoRa terminal device may refer to an agricultural intelligent device and a sensor each configured with a LoRa communication module. The agricultural intelligent device and the sensor include, but are not limited to, an automatic irrigation device, a soil moisture sensor, a weather station device, and a crop monitoring device.

In the embodiments of the present disclosure, the LoRa terminal device can be configured according to the specific requirements and application scenarios of the target communication network, and the specific form and function of the LoRa terminal device are not limited herein.

The target LoRa communication frequency band refers to a frequency band selected from an available LoRa communication frequency band according to the preset communication requirements. That is, in the embodiments of the present disclosure, the target LoRa communication frequency band is selected from an available LoRa communication frequency band according to the preset communication requirements. Specifically, the available LoRa communication frequency band refers to a frequency band applicable to the LoRa communication technology in compliance with the laws and regulations of the region where the frequency band is used and the relevant international standards such as those of the International Telecommunication Union (ITU). The available LoRa communication frequency band generally includes a grant-free Industrial Scientific Medical (ISM) band, such as the frequency band of 868 megahertz (MHz) used in Europe and the frequency band of 915 MHz used in North America.

The communication requirement refers to the specific requirement for the performance and functionality of the communication network in a particular application scenario. The requirement includes, but is not limited to, the following:

1. The number of LoRa terminal devices. The division of the target LoRa communication frequency band needs to satisfy the concurrent communication requirement of all LoRa terminal devices. The greater the number of the LoRa terminal devices is, the greater the number of channels required is. Therefore, when the target LoRa communication frequency band is to be selected, a sufficiently wide frequency band should be selected to guarantee that it can be divided into a sufficient number of channels to support the communication of all LoRa terminal devices.

2. Data transmission rate requirement. If the target communication network requires a relatively high data transmission rate, a relatively wide channel bandwidth may be required during the channel division. In case it is necessary to guarantee a certain number of channels, the requirement for the data transmission rate will also affect the selection of the target LoRa communication frequency band.

3. Communication coverage. LoRa communication frequency bands with different frequencies differ in transmission distance and ability to penetrate obstacles. If the application scenario requires relatively large communication coverage, a target LoRa communication frequency band with a relatively low frequency may need to be selected to enhance the signal propagation performance.

4. Channel interference. When the target LoRa communication frequency band is to be selected, the channel interference in the current environment also needs to be taken into consideration. A frequency band with less interference may be selected as the target LoRa communication frequency band through testing and analysis to guarantee the stability and quality of communication.

In the case where the target LoRa communication frequency band is selected, to manage and assign channel resources more accurately and efficiently, the target LoRa communication frequency band may be divided into at least one frequency sub-band, and each frequency sub-band may be divided into multiple channels. In this manner, through the division of the frequency band and the channel division, not only the concurrent communication requirement of multiple LoRa terminal devices in the target communication system can be satisfied, but also mutual interference between the communication signals of the multiple LoRa terminal devices can be reduced, thereby improving the communication quality.

Generally, the target LoRa communication frequency band is divided into two or more frequency sub-bands, but the target LoRa communication frequency band may also be divided into only one frequency sub-band under certain circumstances. When the target LoRa communication frequency band is divided into only one frequency sub-band, the frequency sub-band is the target LoRa communication frequency band, that is, the target LoRa communication frequency band is directly used as the only one frequency sub-band.

Specifically, it is assumed that the selected target LoRa communication frequency band ranges from 902 MHz to 926 MHz. In this case, the target LoRa communication frequency band may be divided into four frequency sub-bands, and the corresponding frequency ranges of the frequency sub-bands are as follows: frequency sub-band 1: 902 MHz-908 MHz; frequency sub-band 2: 908 MHz-914 MHz; frequency sub-band 3: 914 MHz-920 MHz; frequency sub-band 4: 920 MHz-926 MHz.

In the case where the target LoRa communication frequency band is divided into the above four frequency sub-bands, each frequency sub-band can be divided successively into multiple independent frequency ranges according to a preset channel width of 1 MHz, and the multiple channels corresponding to each frequency sub-band may be defined by using these frequency ranges.

For example, in the first frequency sub-band (902 MHz-908 MHz) in the four frequency sub-bands, it is divided into six channels with a channel width of 1 MHz, and the corresponding frequency ranges of the channels in the first frequency sub-band are as follows: channel 1: 902 MHz-903 MHz; channel 2: 903 MHz-904 MHz; channel 3: 904 MHz-905 MHz; channel 4: 905 MHz-906 MHz; channel 5: 906 MHz-907 MHz; channel 6: 907 MHz-908 MHz.

Similarly, the other frequency sub-bands may be divided into channels in the same manner. For example, the frequency range of the fourth frequency sub-band in the four frequency sub-bands is 920 MHz-926 MHz, and the corresponding frequency ranges of six divided channels with a channel width of 1 MHz are as follows: channel 19: 920 MHz-921 MHz; channel 20: 921 MHz-922 MHz; channel 21: 922 MHz-923 MHz; channel 22: 923 MHz-924 MHz; channel 23: 924 MHz-925 MHz; channel 24: 925 MHz-926 MHz.

It should be noted that, to improve the utilization rate of the target LoRa communication frequency band, each frequency sub-band may be successively divided into multiple independent frequency ranges, and the multiple channels corresponding to each frequency sub-band may be defined by using these frequency ranges. Of course, each frequency sub-band may also be divided into multiple independent frequency ranges in a non-continuous manner, and the multiple channels corresponding to each frequency sub-band may then be defined by using these frequency ranges.

In addition, the channel width is determined according to the number of LoRa terminal devices in the LoRa terminal device group, the requirement for the data transmission rate, and the requirement for the anti-interference capability of the channel. By reasonably determining the channel width, optimal performance and balance can be achieved in the communication system to guarantee that the requirements of a particular application scenario are satisfied.

In the channel assignment solution provided in the present disclosure, a target channel is assigned from multiple channels corresponding to each of the at least one frequency sub-band to each of multiple LoRa terminal device groups to enable each LoRa terminal device in each LoRa terminal device group to communicate with a correspondingly configured LoRa gateway. In this manner, when the communication network is configured with multiple LoRa terminal devices, the multiple LoRa terminal devices may reasonably be divided into multiple LoRa terminal device groups, and then an exclusive target channel is assigned to each LoRa terminal device group to enable one or more LoRa terminal devices in each LoRa terminal device group to communicate with a corresponding LoRa gateway through the exclusive target channel of the device group. In this case, different LoRa terminal device groups do not share channels, and the exclusive target channel assigned to each LoRa terminal device group does not need to carry the communication requirements of other LoRa terminal devices that are not affiliated with the LoRa terminal device group. In this way, each target channel can effectively avoid facing the channel congestion caused by an excessive number of terminal devices.

Therefore, in the channel assignment solution provided in the present disclosure, the channel congestion caused by the insufficiency of channel resources in the presence of the excessive number of LoRa terminal devices can be effectively avoided, thereby effectively guaranteeing the communication quality between the gateway and the terminal devices. Even when a large number of LoRa terminal devices are configured in the communication network, by adopting the channel assignment solution provided in the present disclosure for channel assignment, the channel congestion caused by the insufficiency of channel resources in the presence of the excessive number of LoRa terminal devices can be effectively avoided, thereby effectively guaranteeing the communication quality between the gateway and the terminal devices.

Further, in the case where an exclusive target channel is assigned to each of multiple LoRa terminal device groups and each target channel can support communication between multiple LoRa terminal devices and the LoRa gateway, communication between multiple LoRa terminal devices and the correspondingly configured LoRa gateways can be carried out concurrently. The concurrent communication enables the communication network to simultaneously satisfy more communication requirements, thereby significantly improving the overall communication efficiency of the communication network.

In addition, since each of the multiple channels corresponding to each frequency sub-band occupies an independent frequency range, the communication signals between different channels are isolated from each other. In this manner, the mutual interference between different channels can be effectively avoided, thereby further guaranteeing the communication quality between the gateway and the terminal devices.

In addition, the LoRa communication technology has the advantages of low power consumption and long distance transmission. The use of the LoRa communication technology not only reduces the power consumption of the LoRa terminal devices, but also guarantees the remote communication between the LoRa terminal devices and the LoRa gateway, thereby effectively avoiding the serious signal attenuation between the LoRa terminal devices and the LoRa gateway due to long communication distance and guaranteeing the stability of the communication quality.

It should be noted that the channel assignment solution provided in the present disclosure may be implemented by a server or may be implemented by an electronic device having a channel assignment function independently configured separately from the server.

In addition, the user information and data involved in the present disclosure are all authorized by the user or fully authorized by the parties, the collection, use, and processing of the relevant data need to comply with the relevant laws and regulations and standards of the relevant countries and regions, and there is a corresponding operation portal provided for the user to select or edit the authorization or rejection.

The technical solutions of the present disclosure and how the technical solutions of the present disclosure solve the above technical problems will be described in detail below through specific embodiments. The following related technologies, as optional solutions, may be arbitrarily combined with the technical solutions of the embodiments of the present disclosure, all of which fall within the scope of protection of the embodiments of the present disclosure, and the same or similar concepts or processes may not be repeated in certain embodiments.

FIG. 1 shows a flowchart of a channel assignment method 100 provided in an embodiment of the present disclosure. The method can be applied to a target communication network. The target communication network includes a server, at least one LoRa gateway, and multiple LoRa terminal device groups. Each LoRa terminal device group includes at least one LoRa terminal device. Specifically, the channel assignment method may include steps S101-S102.

In step S101, each of at least one frequency sub-band in a target LoRa communication frequency band is divided into multiple channels, where each of the multiple channels corresponding to each of the at least one frequency sub-band occupies an independent frequency range.

The target communication network belongs to a communication network of an IoT system. Specifically, the target communication network may refer to a logistics IoT communication network, an industrial IoT communication network, a smart home IoT communication network, a smart city communication network, an agricultural IoT communication network, an intelligent transport IoT communication network, etc.

The LoRa gateway refers to a gateway that transmits data using the LoRa communication technology. The LoRa terminal device refers to a terminal device configured with a LoRa communication module. The LoRa communication module is a wireless communication hardware component that performs communication based on the LoRa communication technology. The communication (i.e., data transmission) between the LoRa terminal device and the LoRa gateway is implemented through the LoRa communication module.

In an example, when the target communication network specifically refers to a logistics IoT communication network, the LoRa terminal device may refer to an intelligent robot configured with a LoRa communication module. The intelligent robot includes, but is not limited to, an AGV, a stacking robot, and a sorting robot.

The target LoRa communication frequency band refers to a frequency band selected from an available LoRa communication frequency band according to the preset communication requirements. In the channel assignment method provided in the embodiments of the present disclosure, generally, before channel division, a target LoRa communication frequency band may first be selected from an available LoRa communication frequency band according to the preset communication requirements. The target LoRa communication frequency band is then divided into at least one frequency sub-band.

The available LoRa communication frequency band refers to a frequency band applicable to the LoRa communication technology in compliance with the laws and regulations of the region where the frequency band is used and the relevant international standards such as those of the ITU.

The communication requirement refers to the specific requirement for the performance and functionality of the communication network in a certain application scenario. The requirement includes, but is not limited to, the following:

1. The number of LoRa terminal devices. The division of the target LoRa communication frequency band needs to satisfy the concurrent communication requirement of all LoRa terminal devices. The greater the number of the LoRa terminal devices is, the greater the number of channels required is. Therefore, when the target LoRa communication frequency band is to be selected, a sufficiently wide frequency band should be selected to guarantee that it can be divided into a sufficient number of channels to support the communication of all LoRa terminal devices.

2. Data transmission rate requirement. If the target communication network requires a relatively high data transmission rate, a relatively wide channel bandwidth may be required during the channel division. In case it is necessary to guarantee a certain number of channels, the requirement for the data transmission rate will also affect the selection of the target LoRa communication frequency band.

3. Communication coverage. LoRa communication frequency bands with different frequencies differ in transmission distance and ability to penetrate obstacles. If the application scenario requires relatively large communication coverage, a target LoRa communication frequency band with a relatively low frequency may need to be selected to enhance the signal propagation performance.

4. Channel interference. When the target LoRa communication frequency band is to be selected, the channel interference in the current environment also needs to be taken into consideration. A frequency band with less interference may be selected as the target LoRa communication frequency band through testing and analysis to guarantee the stability and quality of communication.

In the case where the target LoRa communication frequency band is selected, to manage and assign channel resources more accurately and efficiently, the target LoRa communication frequency band may be divided into at least one frequency sub-band, and the frequency sub-bands may be further divided into multiple channels respectively. In this manner, through the division of the frequency band and the channel division, not only the concurrent communication requirement of multiple LoRa terminal devices in the target communication system can be satisfied, but also mutual interference between the communication signals of the multiple LoRa terminal devices can be reduced, thereby improving the communication quality.

Generally, the target LoRa communication frequency band is divided into two or more frequency sub-bands, but the target LoRa communication frequency band may also be divided into only one frequency sub-band under certain circumstances. When the target LoRa communication frequency band is divided into only one frequency sub-band, the frequency sub-band is the target LoRa communication frequency band, that is, the target LoRa communication frequency band is directly used as the only frequency sub-band.

It should be noted that, to improve the utilization rate of the target LoRa communication frequency band, when each of the at least one frequency sub-band in the target LoRa communication frequency band is divided into multiple channels, each frequency sub-band may be successively divided into multiple independent frequency ranges, and the multiple channels corresponding to each frequency sub-band may be defined by using these frequency ranges. Of course, each frequency sub-band may also be divided into multiple independent frequency ranges in a non-continuous manner, and the multiple channels corresponding to each frequency sub-band may then be defined by using these frequency ranges.

In the embodiments of the present disclosure, after each frequency sub-band are divided into multiple channels, step S102 may be executed. In step S102, from the multiple channels corresponding to each of the at least one frequency sub-band, a target channel is assigned to each LoRa terminal device group to enable each LoRa terminal device in each LoRa terminal device group to communicate with a correspondingly configured LoRa gateway.

The purpose of assigning a target channel from multiple channels corresponding to each of the at least one frequency sub-band to each LoRa terminal device group is to enable each of the multiple LoRa terminal device groups to be assigned with an exclusive target channel so that one or more LoRa terminal devices in each LoRa terminal device group can communicate with a corresponding LoRa gateway through the exclusive target channel.

To select the channels with a better (or even the best) channel quality as much as possible and assign them to each LoRa terminal device group as the target channels, the following two specific channel assignment solutions be used for channel assignment.

When the target LoRa communication frequency band is divided into multiple frequency sub-bands, the first specific channel assignment solution may be used for channel assignment.

In the first specific channel assignment solution, at least one channel assignment iteration (sequentially accessing the frequency sub-bands) may first be executed until each of the multiple LoRa terminal device groups is assigned a corresponding candidate channel. Then, when the at least one channel assignment iteration ends, whether remaining frequency sub-bands that have not been accessed (that is, the remaining frequency sub-bands that are not subjected to the channel quality assessment as described below) exist in the multiple frequency sub-bands is determined. If the remaining frequency sub-bands do not exist, the candidate channel corresponding to each LoRa terminal device group is taken as the target channel. If the remaining frequency sub-bands exist, at least one channel optimization iteration may further be executed until each of the multiple frequency sub-bands is subjected to the channel quality assessment, and when the at least one channel optimization iteration ends, the candidate channel corresponding to each LoRa terminal device group is taken as the target channel.

Specifically, each channel assignment iteration is executed as follows. In the first step, a target frequency sub-band that is not subjected to a channel quality assessment is selected from the multiple frequency sub-bands, and the channel quality assessment is performed on the target frequency sub-band to obtain a channel quality of each of channels corresponding to the target frequency sub-band. In the second step, a part of the multiple channels are selected from the multiple channels corresponding to the target frequency sub-band according to the channel quality to be assigned to at least part of the multiple LoRa terminal device groups as corresponding candidate channels.

Specifically, each channel optimization iteration is performed as follows. In the first step, a target frequency sub-band is selected from the remaining frequency sub-bands, and the channel quality assessment is performed on the target frequency sub-band to obtain a channel quality of each of the multiple channels corresponding to the target frequency sub-band. In the second step, when an available channel whose channel quality is superior to the channel quality of the candidate channel exists in the multiple channels corresponding to the target frequency sub-band, the candidate channel corresponding to each LoRa terminal device group is updated by using the available channel.

It should be noted that, to guarantee that the target channel assigned to each LoRa terminal device group is a channel with a higher (or even the highest) channel quality among all the channels, the operation that, when an available channel whose channel quality is superior to the channel quality of the candidate channel exists in the multiple channels corresponding to the target frequency sub-band, the candidate channel corresponding to each LoRa terminal device group is updated by using the available channel generally means that the candidate channel with a low channel quality is updated by using the available channel. That is, the candidate channel with a poor channel quality is preferentially replaced.

The idea of the first specific channel assignment solution is as follows. The channel quality assessment is performed on multiple frequency sub-bands in sequence, and after each frequency sub-band is subjected to the channel quality assessment, the corresponding candidate channel is preferentially assigned to each LoRa terminal device group. In this process, if a LoRa terminal device group that has not been assigned with a candidate channel still exists after one frequency sub-band is subjected to the channel quality assessment and candidate channel is assigned, the channel quality assessment will continue to be performed on the next frequency sub-band, and according to the quality assessment, a candidate channel is assigned to the LoRa terminal device group that has not been assigned with a candidate channel, until each of the multiple LoRa terminal device groups is assigned with a corresponding candidate channel respectively.

In the case where each of the multiple LoRa terminal device groups is assigned with a corresponding candidate channel, whether remaining frequency sub-bands that are not subjected to the channel quality assessment exist in the multiple frequency sub-bands may first be determined, and if the remaining frequency sub-bands do not exist (i.e., frequency sub-bands that are not subjected to the channel quality assessment do not exist), the candidate channel corresponding to each LoRa terminal device group may be taken as the target channel.

If the remaining frequency sub-bands exist (i.e., the frequency sub-bands that are not subjected to the channel quality assessment still exist), the channel quality assessment is performed on the remaining frequency sub-bands in sequence. After each frequency sub-band is subjected to the channel quality assessment, whether a channel whose channel quality is superior to the channel quality of the candidate channel exists in the frequency sub-band is determined, and when the channel whose channel quality is superior to the channel quality of the candidate channel exists in the frequency sub-band, the channel in the frequency sub-band whose channel quality is superior to the channel quality of the candidate channel is used for replacing the candidate channel as the new candidate channel. In this manner, by continuously using the channel with a higher channel quality to replace the original candidate channel as the new candidate channel, each LoRa terminal device group can be assigned with a channel with a higher (or even the highest) channel quality as the candidate channel. With the above constant replacement, if the candidate channel finally assigned to each LoRa terminal device group is taken as the target channel, the target channel assigned to each LoRa terminal device group can be the channel with a higher (or even the highest) quality among all the channels.

As can be seen from the above description, by adopting the first specific channel assignment solution for channel assignment, the channels with a better (or even the best) channel quality can be selected and assigned to the multiple LoRa terminal device groups as the target channels.

In an example, the multiple frequency sub-bands include four frequency sub-bands, each frequency sub-band is divided into ten channels, and the multiple LoRa terminal device groups include five LoRa terminal device groups. If channel quality assessment is performed on the first frequency sub-band in the four frequency sub-bands, according to the channel quality of each channel corresponding to the first frequency sub-band, only three channels are selected from the ten channels to be assigned to three LoRa terminal device groups in the five LoRa terminal device groups as candidate channels. At this time, there are still two LoRa terminal device groups in the five LoRa terminal device groups that have not been assigned with candidate channels. In this case, the channel quality assessment is performed on the second frequency sub-band in the four frequency sub-bands, and after the second frequency sub-band is subjected to the channel quality assessment, according to the channel quality of each channel corresponding to the second frequency sub-band, two channels are preferentially selected to be assigned to the two LoRa terminal device groups that have not been assigned with candidate channels as the candidate channels. Of course, in addition to the two channels, when an available channel whose channel quality is superior to the channel quality of the candidate channel exists, the candidate channel corresponding to the LoRa terminal device group may be updated by using the available channel. After the first frequency sub-band and the second frequency sub-band are subjected to the channel quality assessment, the five LoRa terminal device groups are assigned with the corresponding candidate channels. The channel quality assessment may then be performed on the remaining frequency sub-bands in sequence. After each frequency sub-band is subjected to the channel quality assessment, whether a channel whose channel quality is superior to the channel quality of the candidate channel exists in the frequency sub-band is determined, and when the channel whose channel quality is superior to the channel quality of the candidate channel exists in the frequency sub-band, the channel in the frequency sub-band whose channel quality is superior to the channel quality of the candidate channel is used for replacing the candidate channel as the new candidate channel. Specifically, if a channel whose channel quality is superior to the channel quality of the candidate channel exists in the third frequency sub-band, the channel in the third frequency sub-band whose channel quality is superior to the channel quality of the candidate channel is used for replacing the candidate channel as the new candidate channel. Similarly, if a channel whose channel quality is superior to the channel quality of the candidate channel exists in the fourth frequency sub-band, the channel in the fourth frequency sub-band whose channel quality is superior to the channel quality of the candidate channel is used for replacing the candidate channel as the new candidate channel.

In the embodiments of the present disclosure, when a part of the multiple channels are to be selected from the multiple channels corresponding to the target frequency sub-band according to the channel quality to be assigned to at least part of the multiple LoRa terminal device groups as corresponding candidate channels, first, a preset channel quality standard may be acquired. Multiple usable channels whose channel quality is superior to the channel quality standard are then selected from the multiple channels corresponding to the target frequency sub-band. When a first number does not exceed a second number, the multiple usable channels are assigned to at least part of LoRa terminal device groups in the multiple LoRa terminal device groups which have not been assigned with candidate channels, as corresponding candidate channels. The first number is the number of the multiple usable channels, and the second number is the number of the LoRa terminal device groups which have not been assigned with candidate channels.

That is, in the embodiments of the present disclosure, multiple usable channels whose channel quality is superior to the channel quality standard may be first selected (screened) from the multiple channels corresponding to each frequency sub-band, and then, at least part of the multiple usable channels may be further selected to be assigned to the LoRa terminal device groups which have not been assigned with the candidate channels, as the candidate channels.

Specifically, after the multiple usable channels are selected, if the number of the LoRa terminal device groups which have not been assigned with candidate channels is equal to or greater than the number of the multiple usable channels, the multiple usable channels can be directly assigned to at least part of the LoRa terminal device groups which have not been assigned with candidate channels, as corresponding candidate channels.

When the number of the LoRa terminal device groups which have not been assigned with candidate channels is less than the number of the multiple usable channels, if the channel quality assessment is performed for the first time (i.e., during the first channel assignment iteration), the multiple usable channels may be sorted according to the channel quality to obtain a corresponding first sorting result. A part of the multiple usable channels are selected from the multiple usable channels according to the first sorting result to be assigned to multiple LoRa terminal device groups as the corresponding candidate channels. During the first channel assignment iteration, since no candidate channel has been assigned before the channel assignment is performed according to the first sorting result, there is no need to perform candidate channel optimization.

If the number of the LoRa terminal device groups which have not been assigned with candidate channels is less than the number of the multiple usable channels in a second channel assignment iteration and subsequent channel assignment iterations, the multiple usable channels can be sorted according to the channel quality to obtain a corresponding first sorting result. Then, a part of the multiple usable channels are selected from the multiple usable channels according to the first sorting result to be assigned to the LoRa terminal device groups which have not been assigned with candidate channels, as the corresponding candidate channels. Remaining usable channels in the multiple usable channels are determined, and when the available channel whose channel quality is superior to the channel quality of the candidate channel exists in the remaining usable channels, the candidate channel corresponding to each LoRa terminal device group is updated by using the available channel.

It should be noted that, to guarantee that the target channel assigned to each LoRa terminal device group is a channel with a higher (or even the highest) channel quality among all the channels, when a part of the usable channels are selected from the multiple usable channels according to the first sorting result and assigned to the LoRa terminal device groups which have not been assigned with candidate channels as the corresponding candidate channels, generally, according to the number of LoRa terminal device groups which have not been assigned with candidate channels and the first sorting result, a part of the usable channels with the best channel quality are selected from the multiple usable channels and assigned to the LoRa terminal device groups that have not been assigned with the candidate channels as the corresponding candidate channels. The operation that, when the available channel whose channel quality is superior to the channel quality of the candidate channel exists in the remaining usable channels, the candidate channel corresponding to each LoRa terminal device group is updated by using the available channel generally means that the candidate channel with a low channel quality is updated by using the available channel. That is, the candidate channel with a poor channel quality is preferentially replaced.

When the target LoRa communication frequency band is divided into one or more frequency sub-bands, the second specific channel assignment solution may be used for channel assignment.

In the second specific channel assignment solution, a channel quality assessment may be performed on each of the at least one frequency sub-band to obtain a channel quality of each of the multiple channels corresponding to each of the at least one frequency sub-band. Then, the multiple channels corresponding to each of the at least one frequency sub-band are sorted according to the channel quality to obtain a corresponding second sorting result. The target channel is selected from the multiple channels corresponding to each of the at least one frequency sub-band according to the second sorting result.

The operation that the target channel is selected from the multiple channels corresponding to each of the at least one frequency sub-band according to the second sorting result generally means that multiple channels with the best channel quality are selected from the multiple channels corresponding to each of the at least one frequency sub-band according to the second sorting result and assigned to the multiple LoRa terminal device groups as the target channels, respectively.

By adopting the second specific channel assignment solution for channel assignment, the channels with a better (or even the best) channel quality can be selected and assigned to the multiple LoRa terminal device groups as the target channels.

In addition, when the second specific channel assignment solution is adopted for channel assignment, the channel quality assessment may also be performed concurrently on multiple frequency sub-bands to enhance the efficiency of channel quality assessment, thereby improving the efficiency of channel assignment.

In the embodiments of the present disclosure, the channel quality may be identified by using a signal measurement result. The signal measurement result includes at least one of a received signal strength indication (RSSI) corresponding to the received signal and a signal-to-noise ratio (SNR) corresponding to the received signal.

To obtain the signal measurement result, the at least one LoRa gateway can be controlled by the server to send a test signal to each LoRa terminal device by using a respective one of the multiple channels. Then, a signal measurement is performed on a received signal received by each LoRa terminal device to obtain a corresponding signal measurement result.

In this case, the operation that the channel quality assessment is performed on the target frequency sub-band to obtain a channel quality of each of the multiple channels corresponding to the target frequency sub-band specifically means that the at least one LoRa gateway is controlled by the server to send a test signal to each LoRa terminal device by using a respective one of the multiple channels corresponding to the target frequency sub-band; then, the signal measurement is performed on the received signal received by each LoRa terminal device to obtain a corresponding signal measurement result; the channel quality is identified by using the signal measurement result.

In the embodiments of the present disclosure, if the signal measurement result only includes the RSSI or the SNR, an RSSI threshold or an SNR threshold may be pre-set to serve as the channel quality standard. In this case, the operation that multiple usable channels whose channel quality is superior to the channel quality standard are selected from the multiple channels corresponding to the target frequency sub-band may mean that the channels whose RSSIs or SNRs reach the corresponding threshold are selected from the multiple channels corresponding to the target frequency sub-band, as the usable channels.

If the signal measurement result includes both the RSSI and the SNR, an RSSI threshold and an SNR threshold may be pre-set to serve as the channel quality standard. In this case, the operation that multiple usable channels whose channel quality is superior to the channel quality standard are selected from the multiple channels corresponding to the target frequency sub-band may mean that the channels whose RSSIs and SNRs reach the RSSI threshold and the SNR threshold respectively are selected from the multiple channels corresponding to the target frequency sub-band, as the usable channels.

During the sorting of the multiple usable channels or the sorting of the multiple channels corresponding to each of the at least one frequency sub-band, if the signal measurement result only includes the RSSI or the SNR, the multiple usable channels or the multiple channels corresponding to each of the at least one frequency sub-band may be sorted according to the RSSI or the SNR.

During the sorting of the multiple usable channels or the sorting of the multiple channels corresponding to each of the at least one frequency sub-band, if the signal measurement result includes both the RSSI and the SNR, the following may be pre-set according to the requirements: for the channels whose RSSIs and SNRs reach the RSSI threshold and the SNR threshold respectively, the higher the RSSI is, the higher the channel quality is, or for the channels whose RSSIs and SNRs reach the RSSI threshold and the SNR threshold respectively, the higher the SNR is, the higher the channel quality is. It should be noted that, in the embodiments of the present disclosure, when the signal measurement result includes both the RSSI and the SNR, the channel quality of the channels whose RSSIs and SNRs reach the RSSI threshold and the SNR threshold respectively may be compared according to the requirements.

In the embodiments of the present disclosure, after a corresponding target channel is assigned to each LoRa terminal device group, the at least one LoRa terminal device in each LoRa terminal device group may communicate with a correspondingly configured LoRa gateway through the target channel.

In the channel assignment method provided in the embodiments of the present disclosure, a target channel is assigned from the multiple channels corresponding to each of at least one frequency sub-band to each of multiple LoRa terminal device groups to enable each LoRa terminal device in each LoRa terminal device group to communicate with a correspondingly configured LoRa gateway. In this manner, when the communication network is configured with multiple LoRa terminal devices, the multiple LoRa terminal devices may reasonably be divided into multiple LoRa terminal device groups, and then an exclusive target channel is assigned to each LoRa terminal device group to enable one or more LoRa terminal devices in each LoRa terminal device group to communicate with a corresponding LoRa gateway through the exclusive target channel of the device group. In this case, different LoRa terminal device groups do not share channels, and the exclusive target channel assigned to each LoRa terminal device group does not need to carry the communication requirements of other LoRa terminal devices that are not affiliated with the LoRa terminal device group. In this way, each target channel can effectively avoid facing the channel congestion caused by an excessive number of terminal devices.

Therefore, in the channel assignment method provided in the embodiments of the present disclosure, the channel congestion caused by the insufficiency of channel resources in the presence of the excessive number of LoRa terminal devices can be effectively avoided, thereby effectively guaranteeing the communication quality between the gateway and the terminal devices. Even when a large number of LoRa terminal devices are configured in the communication network, by adopting the channel assignment method provided in the embodiments of the present disclosure for channel assignment, the channel congestion caused by the insufficiency of channel resources in the presence of the excessive number of LoRa terminal devices can be effectively avoided, thereby effectively guaranteeing the communication quality between the gateway and the terminal devices.

Further, in the case where an exclusive target channel is assigned to each of multiple LoRa terminal device groups and each target channel can support communication between multiple LoRa terminal devices and the LoRa gateway, communication between multiple LoRa terminal devices and the correspondingly configured LoRa gateways can be carried out concurrently. The concurrent communication enables the communication network to simultaneously satisfy more communication requirements, thereby significantly improving the overall communication efficiency of the communication network.

In addition, since each of the multiple channels corresponding to each of the at least one frequency sub-band occupies an independent frequency range, the communication signals of different channels are isolated from each other. In this manner, the mutual interference between different channels can be effectively avoided, thereby further guaranteeing the communication quality between the gateway and the terminal devices.

In addition, the LoRa communication technology has the advantages of low power consumption and long distance transmission. The use of the LoRa communication technology not only reduces the power consumption of the LoRa terminal devices, but also guarantees the remote communication between the LoRa terminal devices and the LoRa gateway, thereby effectively avoiding the serious signal attenuation between the LoRa terminal devices and the LoRa gateway due to long communication distance and guaranteeing the stability of the communication quality.

Corresponding to the channel assignment method provided in the embodiments of the present disclosure, the embodiments of the present disclosure further provide a communication method. The communication method is applied to a target communication network. The target communication network includes a server, at least one LoRa gateway, and multiple intelligent robot groups. Each intelligent robot group includes at least one intelligent robot. Each intelligent robot is provided with a LoRa communication module. As shown in FIG. 2, the communication method 200 may specifically include steps S201-S203.

In step S201, each of at least one frequency sub-band in a target LoRa communication frequency band is divided into multiple channels, where each of the multiple channels corresponding to each of the at least one frequency sub-band occupies an independent frequency range.

In step S202, from the multiple channels corresponding to each of the at least one frequency sub-band, a corresponding target channel is assigned for each intelligent robot group.

In step S203, the at least one LoRa terminal device in each LoRa terminal device group communicates with a correspondingly configured LoRa gateway by using the target channel.

In the communication method provided in the embodiments of the present disclosure, a target channel in multiple channels corresponding to each of at least one frequency sub-band is assigned to each of multiple LoRa terminal device groups to enable each LoRa terminal device in each LoRa terminal device group to communicate with a correspondingly configured LoRa gateway. In this manner, when the communication network is configured with multiple LoRa terminal devices, the multiple LoRa terminal devices may reasonably be divided into multiple LoRa terminal device groups, and then an exclusive target channel is assigned to each LoRa terminal device group to enable one or more LoRa terminal devices in each LoRa terminal device group to communicate with a corresponding LoRa gateway through the exclusive target channel of the device group. In this case, different LoRa terminal device groups do not share channels, and the exclusive target channel assigned to each LoRa terminal device group does not need to carry the communication requirements of other LoRa terminal devices that are not affiliated with the LoRa terminal device group. In this way, each target channel can effectively avoid facing the channel congestion caused by an excessive number of terminal devices.

Therefore, in the communication method provided in the embodiments of the present disclosure, the channel congestion caused by the insufficiency of channel resources in the presence of the excessive number of LoRa terminal devices can be effectively avoided, thereby effectively guaranteeing the communication quality between the gateway and the terminal devices. Even when a large number of LoRa terminal devices are configured in the communication network, by adopting the communication method provided in the embodiments of the present disclosure for channel assignment, the channel congestion caused by the insufficiency of channel resources in the presence of the excessive number of LoRa terminal devices can be effectively avoided, thereby effectively guaranteeing the communication quality between the gateway and the terminal devices.

Further, in the case where an exclusive target channel is assigned to each of multiple LoRa terminal device groups and each target channel can support communication between multiple LoRa terminal devices and the LoRa gateway, communication between multiple LoRa terminal devices and the correspondingly configured LoRa gateways can be carried out concurrently. The concurrent communication enables the communication network to simultaneously satisfy more communication requirements, thereby significantly improving the overall communication efficiency of the communication network.

In addition, since each of the multiple channels corresponding to each of the at least one frequency sub-band occupies an independent frequency range, the communication signals between different channels are isolated from each other. In this manner, the mutual interference between different channels can be effectively avoided, thereby further guaranteeing the communication quality between the gateway and the terminal devices.

In addition, the LoRa communication technology has the advantages of low power consumption and long distance transmission. The use of the LoRa communication technology not only reduces the power consumption of the LoRa terminal devices, but also guarantees the remote communication between the LoRa terminal devices and the LoRa gateway, thereby effectively avoiding the serious signal attenuation between the LoRa terminal devices and the LoRa gateway due to long communication distance and guaranteeing the stability of the communication quality.

Corresponding to the channel assignment method and the communication method provided in the embodiments of the present disclosure, the embodiments of the present disclosure further provide a communication system. As shown in FIG. 3, the communication system 300 includes a server 301, at least one LoRa gateway 302, and multiple LoRa terminal device groups 303. Each LoRa terminal device group 303 includes at least one LoRa terminal device 303-1.

Specifically, at least one LoRa terminal device in each LoRa terminal device group communicates with a correspondingly configured LoRa gateway through a target channel. The target channel is assigned through the channel assignment method provided in the embodiments of the present disclosure.

In a possible implementation, the network topology of a communication sub-network between a LoRa terminal device and a LoRa gateway includes a star topology, a mesh topology or a hybrid topology.

In this manner, a suitable network architecture can be flexibly selected according to different application scenarios and requirements to optimize the coverage, reliability, and scalability of the communication.

Corresponding to the channel assignment method provided by the embodiments of the present disclosure, the embodiments of the present disclosure further provide a channel assignment apparatus. The apparatus is applied to a target communication network. The target communication network includes a server, at least one LoRa gateway, and multiple LoRa terminal device groups. Each LoRa terminal device group includes at least one LoRa terminal device. As shown in FIG. 4, the apparatus 400 may include a channel division module 401 and a channel assignment module 402.

The channel division module 401 is used for dividing each of at least one frequency sub-band in a target LoRa communication frequency band into multiple channels, where each of the multiple channels corresponding to each of the at least one frequency sub-band occupies an independent frequency range.

The channel assignment module 402 is used for assigning a target channel from the multiple channels corresponding to each of the at least one frequency sub-band to each LoRa terminal device group to enable each LoRa terminal device in each LoRa terminal device group to communicate with a correspondingly configured LoRa gateway.

In a possible implementation, the apparatus further includes a target communication frequency band selection module and a frequency sub-band division module.

The target communication frequency band selection module is used for selecting the target LoRa communication frequency band from an available LoRa communication frequency band according to preset communication requirements.

The frequency sub-band division module is used for dividing the target LoRa communication frequency band into the at least one frequency sub-band.

In a possible implementation, the channel division module 401 includes a channel width acquisition module and a channel division sub-module.

The channel width acquisition module is used for acquiring a preset channel width.

The channel division sub-module is used for successively dividing each frequency sub-band into multiple independent frequency ranges according to the channel width and defining the multiple channels corresponding to each frequency sub-band by using the multiple frequency ranges.

In a possible implementation, the channel assignment module 402 includes a first iteration execution sub-module, a remaining frequency sub-band determination module, and a first target channel sub-module.

The first iteration execution sub-module is used for, in the case where the at least one frequency sub-band includes multiple frequency sub-bands, executing at least one channel assignment iteration until each of the multiple LoRa terminal device groups is assigned with a corresponding candidate channel, where each channel assignment iteration is executed as follows: a target frequency sub-band that is not subjected to a channel quality assessment is selected from the multiple frequency sub-bands, and the channel quality assessment is performed on the target frequency sub-band to obtain a channel quality of each of multiple channels corresponding to the target frequency sub-band; a part of the multiple channels are selected from the multiple channels corresponding to the target frequency sub-band according to the channel quality to be assigned to at least part of the multiple LoRa terminal device groups as corresponding candidate channels.

The remaining frequency sub-band determination module is used for, when the at least one channel assignment iteration ends, determining whether remaining frequency sub-bands that are not subjected to the channel quality assessment exist in the multiple frequency sub-bands.

The first target channel sub-module is used for, when the remaining frequency sub-bands do not exist, taking a candidate channel corresponding to each LoRa terminal device group as the target channel.

In a possible implementation, the channel assignment module 402 further includes a second iteration execution sub-module and a second target channel sub-module.

The second iteration execution sub-module is used for executing at least one channel optimization iteration until each of the multiple frequency sub-bands is subjected to the channel quality assessment, where each channel optimization iteration is executed as follows: a target frequency sub-band is selected from the remaining frequency sub-bands, and the channel quality assessment is performed on the target frequency sub-band to obtain a channel quality of each of the multiple channels corresponding to the target frequency sub-band; when an available channel whose channel quality is superior to the channel quality of the candidate channel exists in the multiple channels corresponding to the target frequency sub-band, the candidate channel corresponding to each LoRa terminal device group is updated by using the available channel.

The second target channel sub-module is used for, when the at least one channel optimization iteration ends, taking the candidate channel corresponding to each LoRa terminal device group as the target channel.

In a possible implementation, the first iteration execution sub-module includes a channel quality standard acquisition sub-module, a channel selection sub-module, and a first candidate channel optimization sub-module.

The channel quality standard acquisition sub-module is used for acquiring a preset channel quality standard.

The channel selection sub-module is used for selecting multiple usable channels whose channel quality is superior to the channel quality standard from the multiple channels corresponding to the target frequency sub-band.

The first candidate channel optimization sub-module is used for, when a first number does not exceed a second number, assigning the multiple usable channels to at least part of the multiple LoRa terminal device groups as corresponding candidate channels, where the first number is the number of the multiple usable channels, and the second number is the number of the LoRa terminal device groups which have not been assigned with candidate channels.

In a possible implementation, the first iteration execution sub-module further includes a first sorting result acquisition sub-module, a candidate channel assignment sub-module, and a second candidate channel optimization sub-module.

The first sorting result acquisition sub-module is used for sorting the multiple usable channels according to the channel quality to obtain a corresponding first sorting result.

The candidate channel assignment sub-module is used for selecting a part of the multiple usable channels from the multiple usable channels according to the first sorting result to be assigned to the LoRa terminal device groups which have not been assigned with candidate channels as the corresponding candidate channels.

The second candidate channel optimization sub-module is used for determining remaining usable channels in the multiple usable channels and, when the available channel whose channel quality is superior to the channel quality of the candidate channel exists in the remaining usable channels, updating the candidate channel corresponding to each LoRa terminal device group by using the available channel.

In a possible implementation, the channel assignment module 402 further includes a server control module, a signal measurement result acquisition module, and a channel quality identification module.

The server control module is used for controlling the at least one LoRa gateway through the server to send a test signal to each LoRa terminal device by using a respective one of the multiple channels corresponding to the target frequency sub-band.

The signal measurement result acquisition module is used for performing a signal measurement on a received signal received by each LoRa terminal device to obtain a corresponding signal measurement result.

The channel quality identification module is used for identifying the channel quality by using the signal measurement result.

In a possible implementation, the signal measurement result includes at least one of a signal strength corresponding to the received signal and a signal-to-noise ratio corresponding to the received signal.

In a possible implementation, the channel assignment module 402 includes a channel quality acquisition sub-module, a second sorting result acquisition sub-module, and a target channel selection sub-channel.

The channel quality acquisition sub-module is used for performing a channel quality assessment on each of at least one frequency sub-band to obtain a channel quality of each of the multiple channels corresponding to each of the at least one frequency sub-band.

The second sorting result acquisition sub-module is used for sorting the multiple channels corresponding to each of the at least one frequency sub-band according to the channel quality to obtain a corresponding second sorting result.

The target channel selection sub-channel is used for selecting the target channel from the multiple channels corresponding to each of the at least one frequency sub-band according to the second sorting result.

For the functions of the modules in each apparatus in the embodiments of the present disclosure, reference may be made to the corresponding description in the methods described above, and the apparatus has corresponding benefits, which will not be repeated herein.

Figure 5:
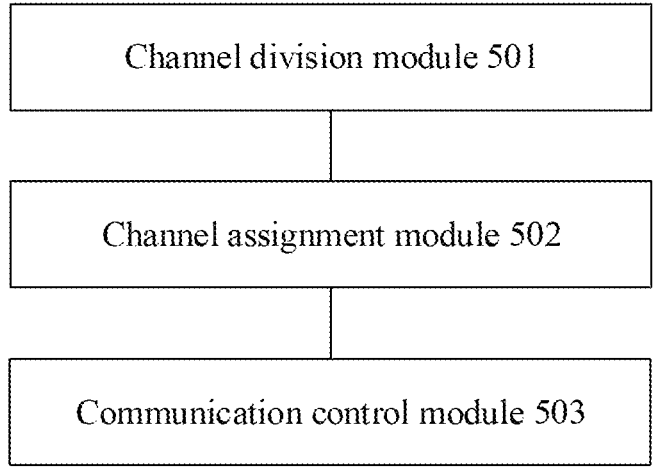
FIG. 5 shows a schematic diagram of a communication apparatus provided in an embodiment of the present disclosure.

Corresponding to the communication method provided in the embodiments of the present disclosure, the embodiments of the present disclosure further provide a communication apparatus. The apparatus is applied to a target communication network. The target communication network includes a server, at least one LoRa gateway, and multiple intelligent robot groups. Each intelligent robot group includes at least one intelligent robot. Each intelligent robot is provided with a LoRa communication module. As shown in FIG. 5, the apparatus 500 may include a channel division module 501, a channel assignment module 502, and a communication control module 503.

The channel division module 501 is used for dividing each of at least one frequency sub-band in a target LoRa communication frequency band into multiple channels, where each of the multiple channels corresponding to each of the at least one frequency sub-band occupies an independent frequency range.

The channel assignment module 502 is used for assigning a corresponding target channel from the multiple channels corresponding to each of the at least one frequency sub-band for each intelligent robot group.

The communication control module 503 is used for communicating between at least one LoRa terminal device in each LoRa terminal device group and a correspondingly configured LoRa gateway by using the target channel.

For the functions of the modules in each apparatus in the embodiments of the present disclosure, reference may be made to the corresponding description in the methods described above, and the apparatus has corresponding benefits, which will not be repeated herein.

Figure 6:
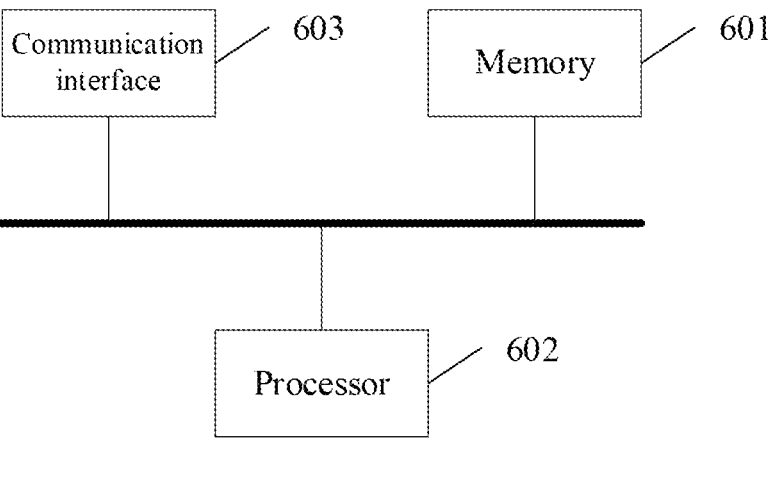
FIG. 6 shows a block diagram of an electronic device for implementation of the embodiments of the present disclosure.

FIG. 6 is a block diagram of an electronic device for implementation of the embodiments of the present disclosure. As shown in FIG. 6, the electronic device includes a memory 601 and a processor 602. The memory 601 has a computer program executable on the processor 602 stored therein. The processor 602, when executing the computer program, implements the methods described in the above embodiments. The number of memories 601 and the number of processors 602 may be one or more.

The electronic device includes a communication interface 603.

The communication interface 603 is used for communicating with an external device for interactive data transmission.

If the memory 601, the processor 602, and the communication interface 603 are implemented independently, the memory 601, the processor 602, and the communication interface 603 may be connected to each other via a bus and communicate with each other. The bus may be an industry standard architecture (ISA) bus, a peripheral component interconnect (PCI) bus or an extended industry standard architecture (EISA) bus. The bus may be divided into an address bus, a data bus, a control bus, and the like. For ease of representation, the bus is represented by only one bold line in FIG. 6, but it does not mean that only one bus or one type of bus exists.

Optionally, in the specific implementation, if the memory 601, the processor 602, and the communication interface 603 are integrated on a single chip, the memory 601, the processor 602, and the communication interface 603 may be connected to each other via an internal interface and communicate with each other.

The embodiments of the present disclosure provide a computer-readable storage medium. The computer-readable storage medium has a computer program stored therein, and the computer program, when executed by a processor, implements the methods provided in the embodiments of the present disclosure.

The embodiments of the present disclosure further provide a chip. The chip includes a processor for calling from a memory and running instructions stored in the memory to cause a communication device in which the chip is installed to execute the methods provided in the embodiments of the present disclosure.

The embodiments of the present disclosure further provide a chip. The chip includes an input interface, an output interface, a processor, and a memory. The input interface, the output interface, the processor, and the memory are connected to each other via an internal connection path. The processor is used for executing codes in the memory, and the processor is used for executing the methods provided in the embodiments of the present disclosure when the codes are executed.

It should be understood that the processor may be a central processing unit (CPU) and may also be other general-purpose processors, a digital signal processor (DSP), an application-specific integrated circuit (ASIC), a field-programmable gate array (FPGA) or other programmable logic devices, a discrete gate or a transistor logic device, or a discrete hardware component. The general-purpose processor may be a microprocessor or any conventional processor. Notably, the processor may be a processor that supports the Advanced RISC Machines (ARM) architecture.

Further, optionally, the memory may include a read-only memory and a random access memory, and may also include a non-volatile random access memory. The memory may be a volatile memory or a non-volatile memory, or may include both the volatile memory and the non-volatile memory. The non-volatile memory may be a read-only memory (ROM), a programmable ROM (PROM), an erasable PROM (EPROM), an electrically EPROM (EEPROM) or a flash memory. The volatile memory may include a RAM which serves as an external cache. By way of exemplary but not limiting illustration, many forms of RAMs are available, for example, a static RAM (SRAM), a dynamic random-access memory (DRAM), a synchronous DRAM (SDRAM), a double data rate SDRAM (DDR SDRAM), an enhanced SDRAM (ESDRAM), a synchlink DRAM (SLDRAM), and a direct Rambus RAM (DRRAM).

The embodiments described above may be implemented fully or partially in software, hardware, firmware, or any combination thereof. When implemented in software, the embodiments may be implemented fully or partially in a computer program product. The computer program product includes one or more computer instructions. When loaded and executed on a computer, the computer program instructions produce, in whole or in part, a process or function in accordance with the present disclosure. The computer may be a general-purpose computer, a special-purpose computer, a computer network, or other programmable apparatuses. The computer instructions may be stored in a computer-readable storage medium or transmitted from one computer-readable storage medium to another computer-readable storage medium.

In the description of the specification, the description of reference terms "one embodiment", "some embodiments", "example", "specific example" or "some examples" means that specific characteristics, structures, materials or features described in connection with the embodiment or the example are included in at least one embodiment or example of the present disclosure. Moreover, the described specific characteristics, structures, materials or features may be combined properly in one or more embodiments or examples. In addition, if not in collision, those skilled in the art may incorporate and combine different embodiments or examples and the features of different embodiments or examples described in the specification.

In addition, terms like "first" and "second" are merely for the purpose of description and are not to be construed as indicating or implying relative importance or implicitly indicating the number of technical features as indicated. Thus, the features defined as "first" and "second" may explicitly or implicitly include one or more of the features. As used herein, the meaning of "plurality" is two or more, unless otherwise specifically limited.

Any process or method description in flowcharts or otherwise described herein may be understood to represent modules, fragments, or portions of code, which include one or more executable instructions for implementing specific logical functions or steps in the process. The scope of the preferred embodiments of the present disclosure includes additional implementations in which functions may be executed out of order from that shown or discussed, including substantially concurrently or in reverse order, depending on the functions involved.

Logic and/or steps represented in the flowcharts or otherwise described herein, for example, may be considered a sequential table of executable instructions for implementing logical functions, and may specifically be implemented in any computer-readable medium for use by, or in conjunction with, an instruction execution system, device, or apparatus (e.g., a computer-based system, a system including a processor, or other systems that can fetch instructions from an instruction execution system, device, or apparatus and execute the instructions).

It should be understood that the sections of the present disclosure may be implemented by hardware, software, firmware or a combination thereof. In the above-mentioned embodiments, a plurality of steps or methods may be implemented by software or firmware stored in a memory and executed by a suitable instruction execution system. All or part of the steps in the method in the above-mentioned embodiments may be implemented by instructing the associated hardware to complete them by means of a program which may be stored in a computer-readable storage medium that, when executed, includes one of the steps of the method embodiment or a combination thereof.

In addition, function units in the embodiments of the present disclosure may be integrated into one processing module, or each of the units may exist alone physically, or two or more units can be integrated into one module. The integrated module may be implemented by hardware or a software function module. The integrated module may also be stored in a computer-readable storage medium if implemented in the form of a software function module and sold or used as an independent product. The storage medium may be a read-only memory, a magnetic disk, or an optical disk.

The above are only embodiments of the present disclosure and are not intended to limit the scope of the present disclosure. It is easy for those skilled in the art to conceive modifications or substitutions within the technical scope disclosed by the present disclosure. These modifications or substitutions are within the scope of the present disclosure. Therefore, the scope of the present disclosure is limited by the appended claims.

The invention claimed is:

1. A channel assignment method, applied to a target communication network, the target communication network comprising a server, at least one Long Range (LoRa) gateway, and a plurality of LoRa terminal device groups, each of the plurality of LoRa terminal device groups comprising at least one LoRa terminal device, and the method comprising:

dividing each of at least one frequency sub-band in a target LoRa communication frequency band into a plurality of channels; wherein each of the plurality of channels corresponding to each of the at least one frequency sub-band occupies an independent frequency range; and assigning a target channel from the plurality of channels corresponding to each of the at least one frequency sub-band to each of the plurality of LoRa terminal device groups to enable each of the at least one LoRa terminal device in each of the plurality of LoRa terminal device groups to communicate with a corresponding LoRa gateway, wherein the at least one frequency sub-band comprises a plurality of frequency sub-bands: the assigning a target channel from the plurality of channels corresponding to each of the at least one frequency sub-band to each of the plurality of LoRa terminal device groups comprises:

executing at least one channel assignment iteration until each of the plurality of LoRa terminal device groups is assigned with a corresponding candidate channel; wherein each of the at least one channel assignment iteration is executed as follows: selecting a target frequency sub-band that is not subjected to a channel quality assessment from the plurality of frequency sub-bands, performing the channel quality assessment on the target frequency sub-band to obtain a channel quality of each of a plurality of channels corresponding to the target frequency sub-band, and selecting, from the plurality of channels corresponding to the target frequency sub-band according to the channel quality, a part of the plurality of channels to be assigned to at least part of the plurality of LoRa terminal device groups as corresponding candidate channels;

when the at least one channel assignment iteration ends, determining whether remaining frequency sub-bands that are not subjected to the channel quality assessment exist in the plurality of frequency sub-bands; and when the remaining frequency sub-bands do not exist, taking the candidate channel corresponding to each of the plurality of LoRa terminal device groups as the target channel.

2. The method according to claim 1, further comprising:

selecting the target LoRa communication frequency band from an available LoRa communication frequency band according to a preset communication requirement; and dividing the target LoRa communication frequency band into the at least one frequency sub-band.

3. The method according to claim 1, wherein the dividing each of at least one frequency sub-band in a target LoRa communication frequency band into a plurality of channels comprises:

acquiring a preset channel width; and successively dividing each of at least one frequency sub-band into a plurality of independent frequency ranges according to the channel width, and defining the plurality of channels corresponding to each of the at least one frequency sub-band by using the plurality of frequency ranges.

4. The method according to claim 1, wherein when the remaining frequency sub-bands exist, the method further comprises:

executing at least one channel optimization iteration until each of the plurality of frequency sub-bands is subjected to the channel quality assessment; wherein each of the at least one channel optimization iteration is executed as follows: selecting the target frequency sub-band from the remaining frequency sub-bands, performing the channel quality assessment on the target frequency sub-band to obtain a channel quality of each of a plurality of channels corresponding to the target frequency sub-band, and when an available channel whose channel quality is superior to the channel quality of the candidate channel exists in the plurality of channels corresponding to the target frequency sub-band, updating the candidate channel corresponding to each of the plurality of LoRa terminal device groups by using the available channel; and when the at least one channel optimization iteration ends, taking the candidate channel corresponding to each of the plurality of LoRa terminal device groups as the target channel.

5. The method according to claim 1, wherein the selecting, from the plurality of channels corresponding to the target frequency sub-band according to the channel quality, a part of the plurality of channels to be assigned to at least part of the plurality of LoRa terminal device groups as corresponding candidate channels comprises:

acquiring a preset channel quality standard;

selecting, from the plurality of channels corresponding to the target frequency sub-band, a plurality of usable channels whose channel quality is superior to the channel quality standard; and when a first number does not exceed a second number, assigning the plurality of usable channels to at least part of LoRa terminal device groups in the plurality of LoRa terminal device groups which have not been assigned with candidate channels as corresponding candidate channels, wherein the first number is a number of the plurality of usable channels, and the second number is a number of the LoRa terminal device groups which have not been assigned with candidate channels.

6. The method according to claim 5, wherein in a second channel assignment iteration and subsequent channel assignment iterations, when the first number exceeds the second number, the method further comprises:

sorting the plurality of usable channels according to the channel quality to obtain a corresponding first sorting result;

selecting, from the plurality of usable channels according to the first sorting result, a part of the plurality of usable channels to be assigned to the LoRa terminal device groups which have not been assigned with candidate channels as the corresponding candidate channels; and determining remaining usable channels in the plurality of usable channels, and when the available channel whose channel quality is superior to the channel quality of the candidate channel exists in the remaining usable channels, updating the candidate channel corresponding to each of the plurality of LoRa terminal device groups by using the available channel.

7. The method according to claim 1, wherein the performing the channel quality assessment on the target frequency sub-band to obtain a channel quality of each of a plurality of channels corresponding to the target frequency sub-band comprises:

controlling, through the server, the at least one LoRa gateway to send a test signal to each of the at least one LoRa terminal device by using a respective one of the plurality of channels corresponding to the target frequency sub-band;

performing a signal measurement on a received signal received by each of the at least one LoRa terminal device to obtain a corresponding signal measurement result; and identifying the channel quality by using the signal measurement result.

8. The method according to claim 7, wherein the signal measurement result comprises at least one of a signal strength of the received signal and a signal-to-noise ratio of the received signal.

9. The method according to claim 1, wherein the assigning a target channel from the plurality of channels corresponding to each of the at least one frequency sub-band to each of the plurality of LoRa terminal device groups comprises:

performing a channel quality assessment on each of the at least one frequency sub-band to obtain a channel quality of each of the plurality of channels corresponding to each of the at least one frequency sub-band;

sorting the plurality of channels corresponding to each of the at least one frequency sub-band according to the channel quality to obtain a corresponding second sorting result; and selecting the target channel from the plurality of channels corresponding to each of the at least one frequency sub-band according to the second sorting result.

\*    \*    \*    \*    \*